United States Patent [19]
Schmutz

[11] Patent Number: 5,930,308
[45] Date of Patent: Jul. 27, 1999

[54] METHOD AND APPARATUS FOR DETECTING SIGNALING TONES IN WIDEBAND DIGITIZED CELLULAR-TELEPHONE SIGNALS

[75] Inventor: Thomas R. Schmutz, Melbourne, Fla.

[73] Assignee: AirNet Communications Corp., Melbourne, Fla.

[21] Appl. No.: 08/614,501

[22] Filed: Feb. 1, 1996

[51] Int. Cl.[6] .............................. H03L 27/06; H03D 3/24
[52] U.S. Cl. .......................... 375/340; 370/326; 375/229
[58] Field of Search ..................................... 375/340, 364, 375/229, 230; 370/326, 526; 455/515, 422; 364/724.19, 724.16; 379/386

[56] References Cited

U.S. PATENT DOCUMENTS

| | | | |
|---|---|---|---|
| 4,510,601 | 4/1985 | Delpit et al. ............................. | 370/326 |
| 5,241,688 | 8/1993 | Arora ...................................... | 455/502 |
| 5,392,348 | 2/1995 | Park et al. .............................. | 370/526 |
| 5,572,588 | 11/1996 | Weng et al. ............................ | 379/386 |

*Primary Examiner*—Tesfaldet Bocure
*Attorney, Agent, or Firm*—Farkas & Manelli PLLC; Russell O. Paige

[57] ABSTRACT

A cellular-telephone-system base station (10) employs a digital band-exclusion filter (30) to detect a supervisory tone, but the filter's record length is shorter than that dictated by the necessary resolution and produces output values at a frequency much lower than the frequency of the supervisory tone. A second filter (32) receives the output, operating on a record whose time duration is long enough to achieve the necessary frequency resolution. The second filter's coefficients are chosen to match the frequency of the signal to which the previous filter's subsampling translates the frequency of the supervisory tone. In this way, the supervisory tone can be detected with the necessary resolution but at storage computational costs less than the input sample rate and required frequency resolution would seem to require.

16 Claims, 1 Drawing Sheet

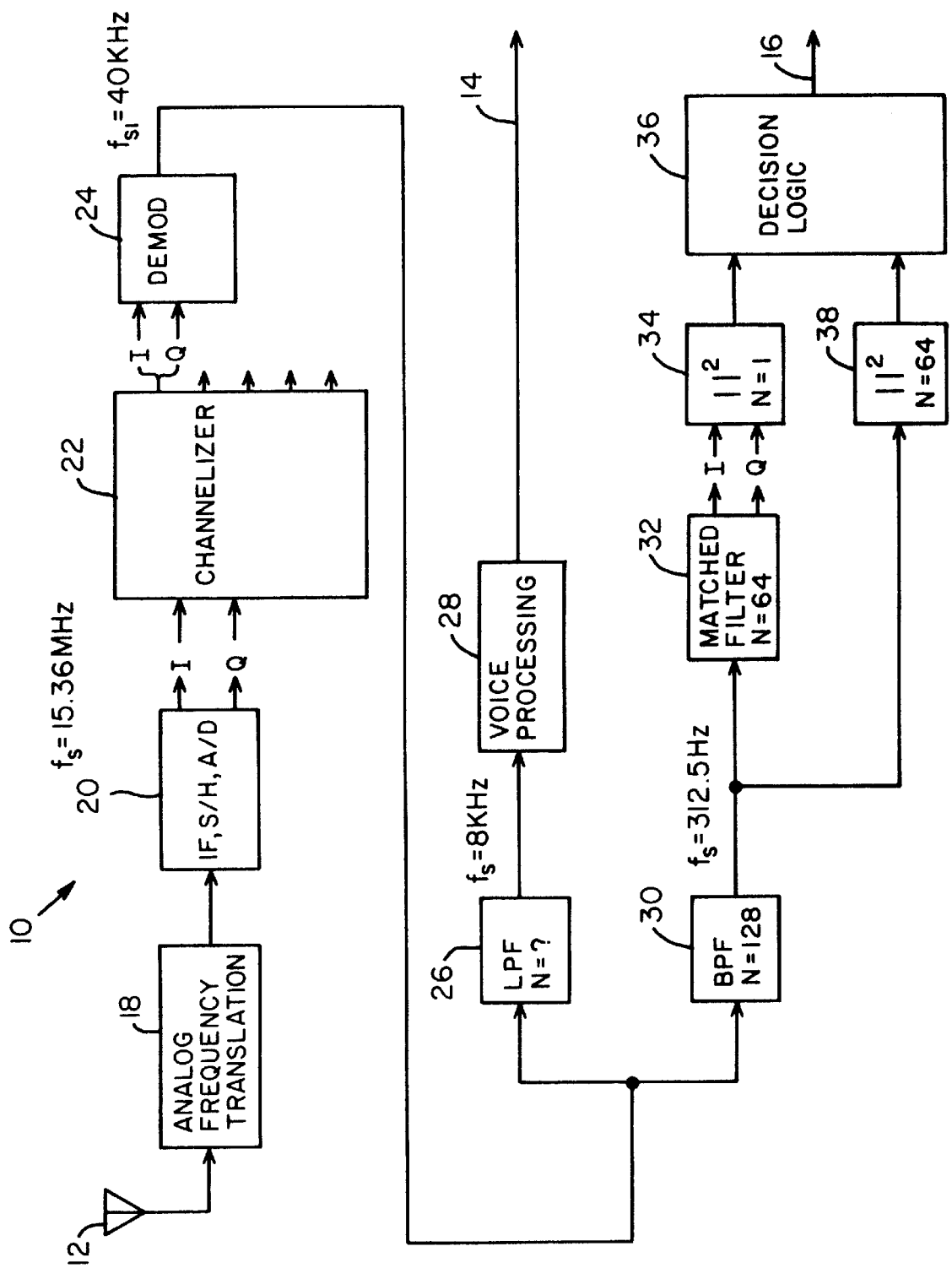

METHOD AND APPARATUS FOR DETECTING SIGNALING TONES IN WIDE-BAND DIGITIZED CELLULAR-TELEPHONE SIGNALS

BACKGROUND OF THE INVENTION

The present invention is directed to the detection of supervisory audio tones and other signaling tones in cellular-telephone signals. In particular, it is directed to detecting these signals digitally.

It has become feasible to perform almost all cellular-system signal processing digitally. In a cellular-telephone base station, for instance, initial analog processing may be limited to translating a multi-channel portion of the cellular-telephone spectrum to an intermediate frequency, and analog-to-digital conversion is performed on the resultant intermediate-frequency signal. All subsequent processing can be performed digitally.

The individual channel typically comprises a frequency-modulated signal that spans a nominally 30-kHz bandwidth. To represent the channel's contents digitally, therefore, one may employ, say, complex samples that occur at a 40 kHz rate and can be demodulated to a 40-kHz real-valued stream. The resultant, demodulated signal's bandwidth typically is great enough to include not only voice but also supervisory tones, whose frequencies are above the range employed for the voice signal.

These tones must be discriminated with relatively great frequency resolution from other signal components. In the AMPS standard, tones of 5970 Hz, 6000 Hz, 6030 Hz, and 10,000 Hz must be distinguished from each other and from noise. Of course, high frequency resolution requires processing relatively long-duration signal records, and this combination of long duration and wide spectrum tends to impose a heavy storage and computational burden.

SUMMARY OF THE INVENTION

I have found that this burden can be reduced by breaking the supervisory-tone detection down into two or more filter operations. The record length processed by a first, band-exclusion filter is not long enough to provide the necessary frequency discrimination, but it does pass the supervisory tones, largely rejects voice frequencies, and narrows the signal bandwidth. Yet the computational burden that it imposes is not great; not only is the record length shorter than the ultimately desired frequency resolution dictates, but outputs are computed much less frequently than the input samples occur.

Indeed, the rate at which the filter produces output values is even lower than the frequency of the very supervisory tone to be detected. But I infer the tone's presence in the filter input by detecting the lower-temporal-frequency output component to which the filter's effective subsampling translates it. That component's detection is performed by a bandpass filter, one whose temporal input-record length is relatively long so as to enable it to achieve the necessarily fine temporal-frequency resolution but whose number of stages is relatively small because its input values occur at the low subsampling rate. If the bandpass filter's output meets a predetermined criterion, the tone is determined to be present.

By thus dividing the processing into two filters, the present invention greatly reduces filter-coefficient-storage requirements and can significantly reduce tone detection's computational cost.

BRIEF DESCRIPTION OF THE DRAWINGS

These and further features and advantages of the present invention are described in connection with the accompanying drawing, which is a block diagram of a cellular-telephone-network base station's receiver section.

DETAILED DESCRIPTION OF AN ILLUSTRATIVE EMBODIMENT

A cellular-telephone-system base station 10 receives many channel signals at its antenna 12. From each channel signal it extracts not only a voice signal 14 but also information from which it produces control signal 16. Signal 16 indicates whether the mobile station is transponding a supervisory audio tone ("SAT"). If a mobile has stopped transponding SAT for some specified length of time, the base station assumes that the mobile call has failed, and the RF and landside connections are terminated. Analog frequency-translation circuitry 18 translates to an immediate frequency the part of the spectrum that contains the several channels of interest. Circuitry 18 applies the result to circuitry 20 for amplifying the resultant intermediate-frequency signal, sampling its in-phase and quadrature components, and converting the samples to complex digital values that occur, for instance, at 15.36 MHz. A digital channelizer divides the incoming signal into the individual channel signals. These signals consist of complex values that occur at a rate $f_{s1}$ high enough to contain the frequency-modulated channel signal. Typically, $f_{s1}$ is on the order of 40 kHz.

As is conventional, the drawing employs separate blocks to depict various sets of the digital circuitry's computation operations even though several operations are typically performed by common circuitry. For example, although the channelizer 22 is likely to be embodied in a number of fast-Fourier-transform butterfly circuits and accompanying registers, a single digital-signal-processing integrated circuit would typically perform all of the processing that the drawing depicts in several blocks downstream of the channelizer 22.

A digital frequency-demodulation circuit 24 processes the complex-valued frequency-modulated signal to produce real values that occur at the sampling rate $f_{s1}$ and represent the sample-to-sample phase advance. The resultant sequence not only carries the voice signals themselves, which are typically limited to the band below about 3 kHz, but may also contain one of a group of possible supervisory and signaling tones, whose frequency $f_{ST}$ lies outside the normal voice band. To exclude the supervisory tones from the signal to be processed as the voice signal, a digital finite-impulse-response filter 26, typically of a relatively few stages, processes the demodulator output. I also employ subsampling to a degree in the voice signal path. Although, as is necessary, filter 26 operates on all of the input samples that it receives, it does so only in producing one output sample for every five input samples. This is adequate to represent the voice information that remains after filtering. The voice signal then proceeds to conventional voice processing presented by block 28.

The filtering that filter 26 performs is not particularly computation intensive; it can be a relatively simple low-pass filter that does not require fine frequency resolution. But supervisory-tone processing does, and this fine frequency resolution in turn necessitates processing a signal record of correspondingly long temporal duration. For instance, a typical supervisory audio tone may have a frequency $f_{ST}$ of 6000 Hz and must be discriminated with a resolution of 30 Hz from other tones. Such resolution would require operating on a signal record in excess of 30 milliseconds in duration, which at 40 kHz would seem to dictate a filter of more than 1200 stages long. And mobile stations in the typical AMPS system would require three such filters, one for each of the possible supervisory audio tones. (They would also require a filter for the 10 kHz signaling tone, but the required resolution for that tone is not so great.)

However, I have greatly reduced the attendant coefficient-storage burden, as well as some of the computational burden, by performing the filtering in stages and subsampling. Specifically, to detect a 6000 Hz supervisory tone, I begin with a band-exclusion filter 30. Here I use the somewhat-unconventional term band-exclusion filter because, although in many instances filter 30 would be implemented as a typical band-pass filter, it is required only to eliminate unwanted frequency components that are likely to be strong in the particular application. In this application, voice-band components fall in that category, and it is conceivable that enough noise to necessitate filtering may be present in other bands, so a bandpass filter may be appropriate. But in some applications filter 30 can instead be, for instance, a high-pass filter consisting of only a relatively few stages; if the only really significant signal components (other than the competing supervisory tones the narrowband filter 32 distinguishes) will be in the voice band, then no further filtering is necessary.

Filter 30's passband is centered at $$\frac{2\pi f_{ST}}{f_{sI}}$$

radians/sample so as to be responsive to the supervisory-tone frequency $f_{ST}$. But filter 30 is only 128 stages long: its input record processed for any given output has a duration of only 128/40 kHz=3.2 msec., which is less than is necessary to achieve the required 30-Hz resolution.

Even so, the 128-stage-transversal filter's 128 coefficient multiplications would impose a significant burden if they were used to generate output values at the 40-kHz rate at which the filter receives its inputs. But I have recognized that it is possible to subsample the filter signal severely. Even though components on the order of 6 kHz are to be detected, I subsample by a factor of 128: filter 30 produces outputs only at a rate of 312.5 Hz, i.e., at a frequency much lower than the frequency of the tones to be detected.

In short, I have greatly reduced the computational requirements by (1) requiring only that filter 30 operate on a record whose time duration is considerably shorter than that which the desired frequency resolution requires and (2) generating outputs at a rate much lower than the frequency to be detected. I am able to achieve this by recognizing that an input frequency of $\omega_{in}$ radians/sample results in an output frequency $\omega_{out}$ of $M\omega_{in}$ mod $2\pi$ radians/sample, where M is the subsampling factor. This corresponds to a temporal frequency of $\omega_{out}f_{sI}/2\pi M$. With the values assumed here, the three AMPS supervisory audio tones result in filter-30 output components of 32.5 Hz, 62.5 Hz, and 92.5 Hz. The low-frequency tone of interest can be detected with the required 30-Hz resolution by employing a subsequent matched filter 32 that operates on the necessarily long-time-duration record but requires relatively few stages to do so. Indeed, filter 32's input record has a time duration of over 200 msec., yet it consists of only sixty-four stages.

The decision as to whether a supervisory tone is present can then be made by any conventional means. For instance, an operation represented by block 34 can take the square or absolute value of the matched filter's (complex) output, and decision logic 36 can simply make the tone-presence determination by comparison with a fixed threshold. But another of the present invention's advantages is that it lends itself to implementation of a dynamically set threshold.

Dynamic threshold setting is desirable because one may prefer to assess the likelihood of a given tone's presence by comparing the signal power that remains after filtering for the tone with the signal power present at the filter input; a filter output is likely to be only noise if its power is a small fraction of the filter's input power. But since the input record of a conventionally implemented filter that operates on a record whose temporal length equals the illustrated embodiment's would be 8192 samples long, such an approach would add prohibitively to the system's overall computational cost. In contrast, an average-power-computation step 38 in the illustrated embodiment operates on an input record that is only sixty-four samples long, so the computational cost of adding dynamic thresholding is modest.

This division of the processing into two parts has other significant advantages. One concerns filter-coefficient storage. All of the coefficients must either be stored ahead of time or computed as the filter process proceeds. Since the latter approach can greatly increase computational overhead, it is often preferable to store the coefficients and obtain them as needed by table look-up. In the conventional approach to achieving the resolution obtained in the illustrated embodiment, the filter would have 8192 stages, and this could conceivably require storage of 8192 complex-valued coefficients, i.e., of 16,384 real values. In practice, this memory size could be reduced somewhat by employing symmetry relationships and so forth, but most reduction schemes exact a cost in computation time, so there is a compromise between storage and computation expense.

In contrast, even if a coefficient needs to be stored for every stage of both filters in the illustrated embodiment, the total number of memory locations still is only 256: filter 32 requires 64 complex coefficients, i.e., 128 real values, and filter 30 also requires only 128 real values because its 128 coefficients are real-valued. Filter 32's coefficients and those of the conventional arrangement's filter are complex so that a reliable measurement can be obtained from a single matched-filter output. In a real-coefficient-value filter, certain (real-valued) single outputs can be negligible even when the input has a high center-frequency component. So if the filter does not use complex coefficients, a reliable measurement would require a sequence of filter outputs rather than just one. But each of the illustrated embodiment's measurements is based on a plurality of filter 30's output values, so its coefficients need only be real-valued.

This latter fact also yields a computational advantage. In the conventional approach, in which all coefficients are real, each sample's processing requires two real multiplication operations and two real accumulation operations. This is true of all 8192 samples but the first (which does not require the accumulation operations). In contrast, processing of a given sample (except the first) in filter 30 requires only one multiplication and one accumulation. So employment of the illustrated approach cuts the processing nearly in half.

The advantage is even greater in systems that must detect more than one tone simultaneously. The outputs of a single wideband filter such as filter 30 can be employed as common inputs to, say, three tone-specific filters like filter 32. And since each of the narrowband filters in the illustrated embodiment processes only 64 input samples, as opposed to the wideband filter's 8192 input samples, performing the initial computations in common makes the teachings of the present invention particularly beneficial in such applications.

In some circumstances, the invention's computational advantages are even greater than is apparent in the illustrated embodiment. Although the illustrated embodiment wideband filter 30 uses all of the 40-kHz-rate input samples that occur during the 205-msec time interval used to resolve the different supervisory tones, reflection reveals that circumstances may occur in which this is not necessary. If noise sources outside the voice band are not excessive, the length of the band-exclusion filter can actually be less—indeed, considerably less—than the decimation rate. The present invention's advantages in computational cost would therefore be even more pronounced in such a system.

The way in which filter 30 subsamples is simply to compute only one output value for every 128 input values. But the teachings of the present invention are applicable to other subsampling approaches, too. Specifically, the teachings of this invention could also be applied to outputs generated by multi-rate techniques, in which the filter coefficients applied to produce the subsampled-output values are not in general the same as those of the non-subsampled filter upon which it is based; that is, the subsampling rate is not limited to integer values and can instead be a fraction.

It is thus apparent that the invention described above can be implemented in a wide variety of embodiments and thus represents a significant advance in the art.

What is claimed is:

1. For detecting a tone of frequency $f_{ST}$ in a digital channel signal that represents the contents of a cellular-telephone channel as a sequence of values that occur at a sample rate $f_s$, a method comprising the steps of:

A) applying the first digital signal to a digital band-exclusion filter having a passband that includes $2\pi f_{ST}/f_s$ radians/sample, the digital band-exclusion filter comprising a subsampling filter having a subsampling factor of M where $M > f_s/f_{ST}$, so that said digital band-exclusion filter generates a band-exclusion-filter output representing a second sequence of digital values, which recur at a sample rate of $f_s/M$;

B) applying the second signal sequence to a digital bandpass filter whose pass band includes $2\pi M f_{ST}/f_s$ mod $2\pi$ radians/sample to generate a bandpass-filter output;

C) determining whether the bandpass-filter output meets a predetermined criterion; and D) generating a tone-presence signal indicative of the result of that determination.

2. A method as defined in claim 1 wherein the band-exclusion filter is a finite-impulse-response filter whose number of coefficients is less than $f_s/f_{ST}$.

3. A method as defined in claim 2 wherein the band-exclusion filter's coefficients are all real-valued.

4. A method as defined in claim 3 wherein the bandpass filter employs complex coefficients.

5. A method as defined in claim 4 wherein the step of determining whether the bandpass-filter output meets a predetermined criterion comprises determining whether the power level represented by the bandpass-filter output exceeds a predetermined fraction of the power level represented by the band-exclusion-filter output.

6. A method as defined in claim 1 wherein the band-exclusion filter's coefficients are all real-valued.

7. A method as defined in claim 6 wherein the bandpass filter employs complex coefficients.

8. A method as defined in claim 1 wherein the step of determining whether the bandpass-filter output meets a predetermined criterion comprises determining whether the power level represented by the bandpass-filter output exceeds a predetermined fraction of the power level represented by the band-exclusion-filter output.

9. A cellular-telephone-receiver comprising:

A) input circuitry for receiving a radio signal and generating therefrom a digital channel signal that represents the contents of a cellular-telephone channel as a sequence of values that occur at a sample rate $f_s$;

B) a digital band-exclusion filter having a pass band that includes $2\pi f_{ST}/f_s$ radians/sample, the band-exclusion filter comprising a subsampling filter having a subsampling factor of M where $M > f_s/f_{ST}$, said digital band-exclusion filter being responsive to the digital channel signal to generate a band-exclusion-filter output representing a sequence of digital values that occur at a sample rate of $f_s/M$;

C) a digital bandpass filter whose pass band includes $2\pi f_{ST}/f_s$ mod $2\pi$ radians/sample, the bandpass filter being responsive to the band-exclusion-filter output to generate a bandpass-filter output; and D) a tone-detection circuit responsive to the bandpass-filter output for determining whether the bandpass-filter output meets a predetermined criterion and for generating a tone-presence signal indicative of the result of that determination.

10. A receiver as defined in claim 9 wherein the band-exclusion filter is a finite-impulse-response filter whose number of coefficients is less than $f_s/f_{ST}$.

11. A receiver as defined in claim 10 wherein the band-exclusion filter's coefficients are real-valued.

12. A receiver as defined in claim 11 wherein the bandpass filter's coefficients are complex.

13. A receiver as defined in claim 12 wherein the tone-detection circuit comprises circuitry for determining whether the power level represented by the bandpass-filter output exceeds a predetermined fraction of the power level represented by the band-exclusion-filter output.

14. A receiver as defined in claim 9 wherein the band-exclusion filter's coefficients are real-valued.

15. A receiver as defined in claim 14 wherein the bandpass filter's coefficients are complex.

16. A receiver as defined in claim 9 wherein the tone-detection circuit comprises circuitry for determining whether the power level represented by the bandpass filter's output exceeds a predetermined fraction of the power level represented by the band-exclusion filter's output.

* * * * *